United States Patent
Patterson et al.

[15] 3,680,742
[45] Aug. 1, 1972

[54] SEED DISPENSING APPARATUS

[72] Inventors: Roger Lee Patterson; Bryan William Brodie, both of Fonthill, Ontario, Canada

[73] Assignee: Deere & Company, Moline, Ill.

[22] Filed: Nov. 4, 1970

[21] Appl. No.: 86,815

[52] U.S. Cl. .................. 222/177, 222/367, 85/5 R
[51] Int. Cl. ............................................. A01c 7/12
[58] Field of Search......222/177, 268, 294, 295, 296, 222/297, 302, 303, 312, 313, 368, 367; 221/266; 301/119, 120, 121, 122; 257/52.04, 52.07; 85/5, 80, 81

[56] References Cited

UNITED STATES PATENTS

| | | | |
|---|---|---|---|
| 2,783,918 | 3/1957 | Bramblett | 222/177 |
| 2,936,805 | 5/1960 | Rice | 85/5 R X |
| 3,217,584 | 11/1965 | Amesbury | 85/80 |
| 2,663,895 | 12/1953 | Petri | 85/5 R |

*Primary Examiner*—Samuel F. Coleman
*Assistant Examiner*—Larry Martin
*Attorney*—H. Vincent Harsha, Harold M. Knoth, William A. Murray, Raymond L. Hollister and John M. Nolan

[57] ABSTRACT

A seed cup and feed wheel unit for dispensing seed from a hopper, the feed wheel being of the single, internal run type and including a hub portion journaled in the cup. A releasable retainer member extends through the hub portion and acts between the wheel and cup to retain the former on the latter. A drive shaft for the wheel which extends through and is drivingly connected to the hub normally prevents release of the retainer member, the member being releasable to permit removal of the wheel from the cup only upon removal of the shaft.

11 Claims, 3 Drawing Figures

PATENTED AUG 1 1972

3,680,742

*INVENTORS*
ROGER L. PATTERSON
BRYAN W. BRODIE

SEED DISPENSING APPARATUS

BACKGROUND OF THE INVENTION

The present invention relates generally to seed-dispensing apparatus and more particularly to a seed cup and feed wheel unit for use on a grain drill or the like.

Seed-dispensing apparatus of the type commonly used on grain drills and the like generally includes a transversely elongated grain box or hopper, the bottom of which is provided with a plurality of spaced openings adapted to register with an equal number of seed cups mounted thereon. Associated with each of the seed cups is a rotatable feed wheel which meters the seed from the cup into a vertical discharge tube, the tube, in turn, directing the seed into the soil. The feed wheels on the several dispensing units are driven by a common shaft extending transversely along the underside of the hopper and through each of the wheels. In the use of such apparatus, it is sometimes necessary to replace some or all of the feed wheels, an operation which, due to the construction and arrangement of such conventional seed dispensing apparatus, has in the past required considerable time and effort.

SUMMARY OF THE INVENTION

It is, accordingly, the principal object of the present invention to provide a seed cup and feed wheel dispensing unit having means permitting quick and easy removal and replacement of the feed wheel. It is a further object to provide such a dispensing unit which includes means operable to retain the feed wheel on the cup independently of the presence of the drive shaft in the unit. It is yet a further object to provide such a unit in which the shaft, when in place in the feed wheel, is operable to prevent release of the retaining means, the wheel thus being removable from the cup only upon removal of the shaft. It is a still further object to provide such a dispensing unit in which the retaining means is operable to bias the wheel against the cup and thereby effect a seed-tight seal between the members.

In pursuance of these and other objects, the present invention comprises a seed cup mounted on and communicating with a seed hopper, the cup having a seed outlet opening on one of its sides. A single, internal run feed wheel is mounted on the side of the cup and includes an annular chamber opening toward the cup and overlying the outlet opening therein. A plurality of angularly spaced internal ribs or teeth formed in the rim of the wheel and extending into the annular chamber are operative to advance seed from the outlet of the cup to a rear discharge point as the wheel rotates. Extending through the hub portion of the wheel is a retainer member for maintaining the feed wheel against the cup, the member including a head portion surrounding the shaft and acting against the side of the cup opposite the outlet opening, and a plurality of angularly-spaced prongs formed integrally with the head and extending through the hub between the surfaces of the hub and the wheel drive shaft. Each of the prongs includes a radially outwardly extending projection on its outer end which acts against the outer surface of the wheel to normally prevent its axial removal from the cup. Resilient means are interposed between the projections and the wheel to bias the inner edge of the wheel rim against the side of the cup and thereby assure a seed-tight seal between the members. Release of the wheel from the cup is accomplished by first removing the shaft from the wheel, then moving the projections on the prongs of the retainer member radially inwardly a distance sufficient to clear the surface of the wheel, the prongs being flexible to permit such inward movement. Since the prongs are biased to engage the wheel independently of the presence of the shaft in the hub, the shaft can thus be removed without the necessity of simultaneously removing the wheel, and, likewise, the feed wheels can be replaced without the necessity of simultaneously replacing the shaft.

BRIEF DESCRIPTION OF THE DRAWING

The preferred embodiment of the invention will be described in conjunction with the accompanying drawing in which.

DESCRIPTION OF THE PREFERRED EMBODIMENT

Figure 1:
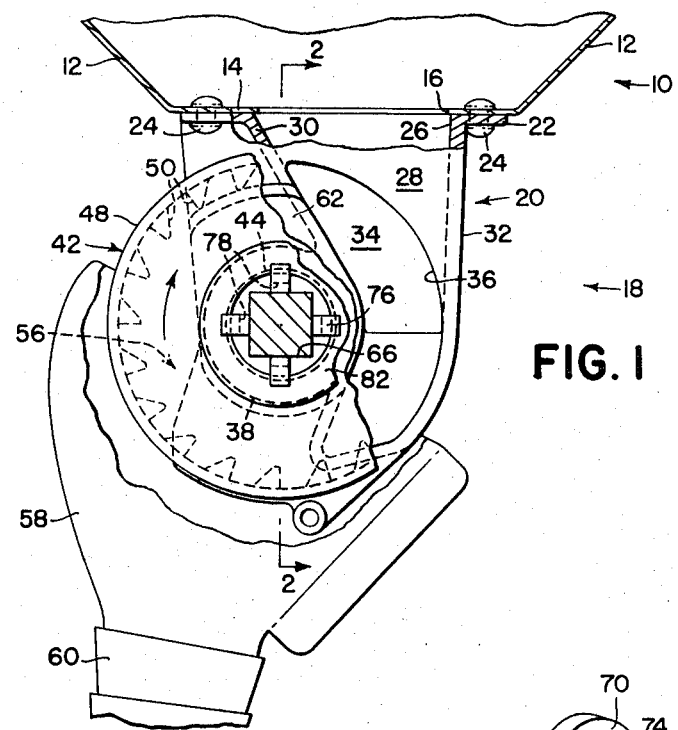
FIG. 1 is a side view of a seed cup and feed wheel dispensing unit constructed in accordance with the principles of the invention, with portions broken away for the sake of clarity.

Referring now to the drawing, the numeral 10 designates an elongated seed box or hopper for a grain drill or the like having opposite side walls 12 and a bottom wall 14. A plurality of seed outlet openings 16, only one being shown in the drawing, are provided at spaced locations along the bottom 14 for discharging seed into the distributing apparatus 18 of the invention. The apparatus 18 includes a seed cup 20 mounted on and extending downwardly from the bottom 14 of the hopper, the seed cup including a flanged horizontal upper portion 22 riveted at 24 to the bottom 14 and having a seed inlet opening 26 in register with the opening 16. A substantially vertical side wall 28 is formed integrally with the right side of the opening 26 therein. Additional front, rear and left side walls 30, 32 and 34 converge downwardly from the respective sides of the opening in the flange and are joined with the vertical wall 28 around a crescent-shaped seed outlet opening 36 provided therein. An enlarged central portion 38 is formed in the cup 20 just forwardly of the front wall 30 and opening 36 and includes a transverse circular bore 40 having an internal wall defining a journal for rotatably supporting a feed wheel 42.

The feed wheel 42 is of the internal run type and includes a cylindrical hub portion 44 journaled in the bore 40 of the cup, a circular vertical side 46 depending from the right end of the hub, and an outer flange or rim 48 on the periphery of the side 46 and having a plurality of ribs or teeth 50 formed at angularly-spaced intervals along its internal surface. The inner edge 52 of the wheel rim 48 lies against the wall 28 of the cup and forms a seed-tight seal around the crescent-shaped opening 36 therein. The rim 48 and circular wall 46 of the feed wheel, in conjunction with the enlarged portion 38 of the cup, form an annular chamber 54 opening toward the wall 28 of the cup, the forward portion of the chamber overlying the opening 36 in the wall and the rear portion of the chamber extending rearwardly beyond the wall to a discharge area designated generally by the numeral 56. In operation, the feed wheel 42 rotates relative to the cup 20 in the direction indicated by the arrow in FIG. 1, and the teeth 50 formed on the internal surface of the rim 48 engage the seed discharged through the outlet 36 and move it rearwardly to the discharge area 56. The angled surfaces of the teeth 50 deflect the seed out of the chamber 54 and into the upper funnel portion 58 of a flexible seed tube 60. The tube 60, in turn, directs the seed downwardly to the soil. As shown best in FIG. 2, a portion 62 of the wall 28 extends into and blocks the annular chamber 54 between the discharge area 56 and the opening 36 to prevent seeds from being carried on around by the wheel.

Figure 3:
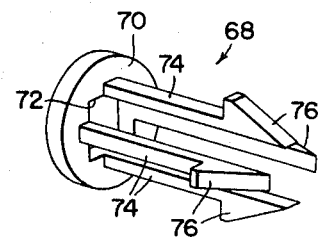
Figure 2:
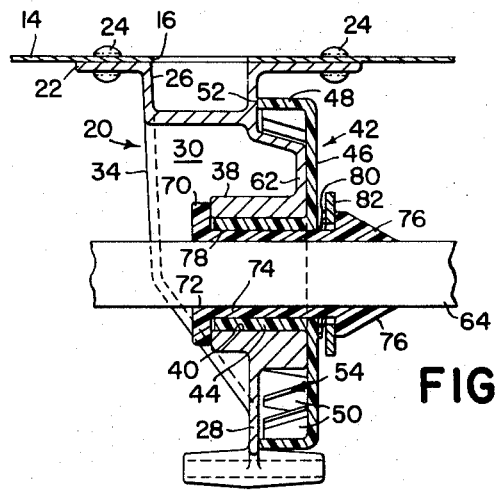
FIG. 2 is a cross sectional view of the unit, taken along the line 2—2 of FIG. 1; and, FIG. 3 is a perspective view of the retainer member which serves to retain the wheel on the cup.

A square cross-sectioned drive shaft 64 having a plurality of axially extending flat sides extends transversely beneath the hopper 10 to commonly drive each of the dispensing units 18. The shaft is drivingly received in a complimentary-shaped square aperture 66, also having a plurality of axially extending flat surfaces, in the hub portion 44 of the wheel. A retainer member or locking device 68, shown in perspective in FIG. 3, extends axially through the hub portion of the wheel between the hub and the shaft and acts between the enlarged portion 38 of the cup and the wall 46 of the wheel to retain the wheel on the cup. The retainer comprises a circular head or end portion 70 provided with a square aperture 72 for receiving the shaft 64, and four resilient prongs 74 formed integrally with the head portion on each side of the aperture 72, each of the prongs including a radially outwardly extending end portion or projection 76 on its outer free end and a central elongated and axially extending portion extending between the end portions 70, 76. In position, as shown in FIGS. 1 and 2, the prongs 74 lie in grooves or slots 78 formed in the walls of the aperture 66 in the hub of the wheel, the inner and outer surfaces of the prongs thus lying against the shaft and hub, respectively. The inner surface or shoulder of the head portion 70 lies against the outer end of the enlarged portion 38 of the cup, and the projections 76 extend radially beyond the aperture in the wheel to prevent removal of the wheel from its position on the cup and to retain the wheel and wall structure of the seed cup against one another. A spring washer 80 and flat washer 82 are interposed between the wall 46 of the wheel and the projections 76 to bias the edge 52 of the wheel rim 48 against the vertical side wall 28 of the cup and assure a seed-tight seal. The retainer is composed of a flexible plastic material such that the prongs 74, upon removal of the shaft 64 from the wheel, may be moved radially inwardly to permit the projections 76 to clear the surface of the wheel. The prongs are normally in the locking position shown in the drawing, and thus serve to retain the wheel on the cup independently of the presence of the shaft in the unit, the shaft merely serving to prevent removal of the wheel.

To remove a feed wheel from one of the dispensing units, the shaft 64 must first be withdrawn from the wheel. The washers 80 and 82 may then be removed from the retainer and the retainer withdrawn from the unit using suitable means to force the prongs radially inwardly until the projections 76 clear the walls of the aperature 66. Upon removal of the retainer member, the wheel can be axially withdrawn from the cup. Installation of the wheel involves a substantial reversal of the foregoing steps. The wheel is first placed in position on the cup. The retainer member 68 is then inserted into the hub 44 from the left as viewed in FIG. 2, with the prongs 74 in the grooves 78 in the walls of the aperture 66. As clearly shown in the drawing, the ends of the projections 76 on the outer end portions of the prongs are tapered to deflect the prongs inwardly as the member is inserted axially into the hub. The washers 80 and 82 are then inserted, in that order, between the wall 46 of the wheel and the projections 76 to bias the edge 52 of the wheel against the vertical wall of the seed cup 20. Finally, the shaft 64 is reinserted in the hub of the wheel as shown in FIG. 2.

We claim:
1. Seed dispensing apparatus comprising:
   a. a seed container having a seed outlet opening;
   b. a seed cup mounted on the container, the cup having a seed inlet opening communicating with the outlet opening in the container and a seed outlet opening in one of its sides;
   c. a feed wheel mounted on the side of the seed cup containing the seed outlet opening and including a hub portion rotatably supported on the cup, the hub portion having a central, axially extending shaft-receiving opening with an axially extending, radially inwardly opening groove in the wall thereof, the feed wheel further having an outer rim lying adjacent to the side wall of the cup and forming a seed-tight seal therewith around the seed outlet opening, and structure defining an annular chamber opening toward the wall of the cup, a first portion of the chamber overlying the seed outlet opening therein and an angularly-spaced second portion of the chamber extending beyond the side wall to a seed discharge area;
   d. an axially extending retainer member having a center portion seated in the groove in the hub portion of the wheel and radially outwardly extending opposite end portions acting between the wheel and the cup, respectively, to retain the former axially on the latter, the center portion of the member being movable radially inwardly from the groove and at least one of the end portions being movable therewith to permit axial removal of the wheel from the cup; and,
   e. a rotatable shaft receivable by the shaft-receiving opening in the hub and drivingly connected to the wheel, the shaft normally overlying the groove in the hub portion and preventing inward radial movement of the retainer member from the groove but being removable from the hub to permit such movement of the member and thus axial removal of the wheel from the cup.

2. The invention defined in claim 1 including resilient means interposed between one of the end portions of the retainer member and its associated acting member to bias the wheel axially against the cup.

3. The invention defined in claim 1 including a plurality of circumferentially spaced, axially extending grooves in the wall of the shaft-receiving opening, and wherein said retainer member includes a plurality of circumferentially spaced, axially extending portions seated in said grooves, said portions being interconnected at one of their ends to flex radially inwardly.

4. Seed dispensing apparatus comprising:
   a. a seed container having a seed outlet opening;
   b. a seed cup mounted on the container, the cup having a seed inlet opening communicating with the outlet opening in the container and a seed outlet opening in one of its sides;
   c. a rotatable seed dispensing wheel including a hub portion journaled in the cup and having an axially extending shaft-receiving aperture, the walls of the aperture including a plurality of axially extending grooves, an outer rim lying adjacent to the side wall of the cup and forming a seed-tight seal therewith around the seed outlet opening, and structure defining an annular chamber opening toward the wall of the cup, a first portion of the chamber overlying the seed outlet opening therein and an angularly-spaced second portion of the chamber extending beyond the side wall to a seed discharge area;
   d. a retainer member for retaining the wheel on the cup, the member including a head portion on one end of the hub and engageable with the cup to limit axial movement of the member toward the wheel, the head portion having an axially extending shaft-receiving aperture aligned with the aperture in the hub portion, and a plurality of prongs integral with the head portion and extending through the grooves in the walls of the shaft-receiving aperture in the hub portion of the wheel, the outer ends of the prongs including radially outwardly extending projections acting against the wheel to prevent its removal from the cup, the projections being movable radially inwardly sufficiently to clear the wheel and permit its removal from the cup; and,
   e. a rotatable shaft drivingly connected to the wheel and extending through the shaft-receiving apertures in the hub portion of the wheel and the head portion of the retaining member, the shaft normally preventing radial inward movement of the projections on the retaining member but being removable from the hub to permit such movement and thus removal of the wheel from the cup.

5. The invention defined in claim 4 wherein the prongs of the retainer member are flexible radially inwardly.

6. The invention defined in claim 5 including resilient means interposed between the projections on the retainer member and the wheel to bias the latter against the cup.

7. A seed dispensing apparatus comprising: a noncircular rotatable drive shaft having a flat external axially extending surface; a seed dispensing cup fixed against movement and having an axially extending opening concentric with and defined by an internal journal wall spaced from the shaft, said cup further having wall structure with a seed passage extending between a seed inlet and a seed outlet, the latter being radially offset with respect to the shaft structure; a seed dispensing wheel in opposed relation to the wall structure having a hub portion with an axially extending noncircular opening receiving the shaft and being externally journaled in the opening, the hub further having an axially extending radial slot opposite the flat surface; and a snap-in locking device including an axially elongated resilient central portion seated in said slot and radially extending end portions opposite the wall structure and wheel respectively for retaining the latter adjacent one another, one of said end portions being joined with and yieldable radially with said central portion.

8. A seed dispensing apparatus comprising: a noncircular rotatable drive shaft; a seed dispensing cup fixed against movement and having an axially extending opening concentric with and defined by an internal journal wall spaced from the shaft, said cup further having wall structure with a seed passage therein extending between a seed inlet and a seed outlet, the latter being radially offset with and for discharging seed axially with respect to the shaft; a seed dispensing wheel in opposed relation to the wall structure having a hub portion with an axially extending noncircular opening receiving the shaft for rotation therewith and being externally journaled in the opening, the hub further having an axially extending radial slot; and a snap-in locking device including an axially elongated resilient central portion seated in said slot and radially extending end portions opposite the wall structure and wheel respectively for retaining them adjacent one another, one of said end portions being joined with and yieldable radially with said central portion.

9. A seed dispensing apparatus as set forth in claim 8 characterized by the shaft having a flat side and the hub having flat sides in contact therewith; the slot is recessed from the flat side of the hub; and the central portion has an inner flat face in the plane of the flat side of the hub.

10. The seed dispensing apparatus as set forth in claim 8 characterized by the opposite end portion being a ring concentric with the shaft.

11. A seed dispensing apparatus comprising: a noncircular rotatable drive shaft having a plurality of flat external axially extending sides; a seed dispensing cup fixed against movement having an axially extending opening concentric with and defined by an internal journal wall spaced from the shaft, said cup further having wall structure with a seed passage extending between a seed inlet and a seed outlet, the latter being radially offset with respect to the shaft; a seed dispensing wheel in opposed relation to the wall structure having a hub portion externally journaled in the journal wall with an axially extending noncircular opening receiving the shaft and having a plurality of flat internally axially extending surfaces opposite to and closely adjacent the aforesaid sides of the shaft, the hub further having axially extending slots extending radially outwardly from the surfaces; and a snap-in locking device including a plurality of angularly spaced and axially elongated resilient central portions seated in said slot and radially extending end portions opposite the wall structure and wheel respectively for retaining the latter adjacent one another, one of said end portions being a ring joining the ends of said central portions and the other being integral radially extending lugs joined with the opposite ends of the central portions and being yieldable radially with said central portions.

* * * * *